United States Patent Office 3,822,246
Patented July 2, 1974

3,822,246
AZO COMPOUNDS CONTAINING AN
IMIDOALKANOYLAMINO GROUP
Max A. Weaver and Herman S. Pridgen, Kingsport, Tenn.,
assignors to Eastman Kodak Company, Rochester, N.Y.
No Drawing. Filed May 15, 1972, Ser. No. 253,581
Int. Cl. C09b 29/08, 29/36
U.S. Cl. 260—152
7 Claims

ABSTRACT OF THE DISCLOSURE

Azo compounds consisting of a disperse dye, phenyl diazo component and an aniline coupling component substituted with an imidoalkanoylamino group produce yellow to blue shades on polyester fibers and exhibit excellent fastness to light and resistance to sublimation.

This invention relates to certain novel azo compounds and, more particularly, to certain novel monoazo compounds having a phenyl diazo component and an aniline coupling component.

The novel compounds of our invention have the general formula

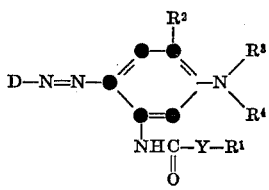

wherein

D is a disperse dye phenyl diazo component substituted with at least one substituent;
Y is alkylene of one to about six carbon atoms;
$R^1$ is a group having the formula

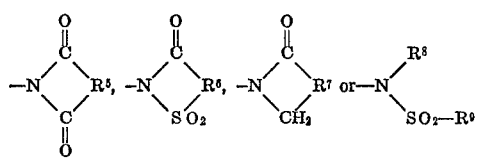

wherein $R^5$ is alkylene of two or three carbon atoms, alkylene of two or three carbon atoms substituted with hydroxy or lower alkanoyloxy, o-cyclohexylene, o-arylene, ethyleneoxyethylene,

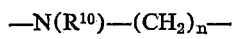

in which $R^{10}$ is hydrogen or lower alkyl and $n$ is one or two, or —SCH$_2$—;
$R^6$ is o-arylene;

$R^7$ is alkylene of two or three carbon atoms or o-arylene;
$R^8$ is lower alkyl; and
$R^9$ is aryl;
$R^2$ is hydrogen, lower alkyl, or lower alkoxy;
$R^3$ is hydrogen, alkyl having one to about eight carbon atoms, cyclohexylmethyl or benzyl; and
$R^4$ is lower alkyl, cyclohexylmethyl, benzyl or cyclohexyl.

Our novel compounds produce yellow to blue shades on polyester fibers when applied thereto by conventional disperse dyeing techniques. Our azo compounds exhibit, in general, excellent fastness to light and resistance to sublimation, the latter of which renders our compound especially suitable for application to polyester fibers by the heat fixation technique of dyeing. This combination of properties distinguishes our novel compounds from known azo dyes such as those disclosed in British Pat. 1,241,470.

A vast number and variety of disperse dye phenyl diazo components are disclosed in the many patents directed to disperse azo dyes. Some examples of the substituents which can be present on the phenyl group represented by D include nitro, halogen, lower alkylsulfonyl, formyl, lower alkanoyl, lower alkoxycarbonyl, cyano, trifluoromethyl, sulfamoyl, lower alkylsulfamoyl, carbamoyl, lower alkylcarbamoyl, thiocyanato, etc. As used herein to describe a group containing an alkyl moiety, "lower" designates a carbon content from 1 to about 4 carbon atoms. The alkanoyl groups can be substituted with substituents such as halogen, phenyl, cyano, lower alkoxy, hydroxy, lower alkylsulfonyl, phenyl, etc. The alkylsulfonyl groups can also be substituted, for example, with cyano, hydroxy, halogen and the like. Typical of the groups, containing an alkyl moiety, which can be present on phenyl diazo component D are methylsulfonyl, ethylsulfonyl, propylsulfonyl, butylsulfonyl, acetyl, propionyl, isobutyryl, methoxycarbonyl, ethoxycarbonyl, butoxycarbonyl, dimethylsulfamoyl, ethylsulfamoyl, propylsulfamoyl, dibutylsulfamoyl, methylcarbamoyl, diethylcarbamoyl, butylcarbamoyl, etc. Chlorine and bromine are typical halogen atoms which can be present on phenyl diazo component D.

Illustrative of the phenyl groups which D can represent are 2-chloro-4-nitrophenyl,
4-nitrophenyl,
2-chloro-4-methylsulfonyl,
2,4-di(methylsulfonyl)phenyl,
2-methylsulfonyl-4-nitrophenyl,
2-nitro-4-methylsulfonylphenyl,
2-acetyl-4-nitrophenyl,
2-ethoxycarbonyl-4-nitrophenyl,
2,4-dinitro-6-chlorophenyl,
2-cyano-4,6-dinitrophenyl,
2,6-dicyano-4-nitrophenyl,
4-methoxycarbonylphenyl,
2-ethylsulfonyl-4,6-dinitrophenyl,
2-formyl-4,6-dinitrophenyl,
2,4-dinitro-6-propionylphenyl,
2-ethoxycarbonyl-4,6-dinitrophenyl,
2-trifluoromethyl-4-nitrophenyl,
2,4-dicyanophenyl,
2-bromo-6-cyano-4-nitrophenyl,
4-nitro-2-sulfamoylphenyl,
2-nitro-4-(dimethyl)sulfamoylphenyl,
4-cyanophenyl,
4-methylsulfonylphenyl,
4-trifluoromethylphenyl,
4-chlorophenyl, 4-ethylsulfamoylphenyl,
4-acetylphenyl,
4-ethylcarbamoylphenyl,
2-carbamoyl-4-nitrophenyl,
2-methylsulfonyl-4-thiocyanophenyl,
2,6-dichloro-4-nitrophenyl,
2-nitro-4-thiocyanatophenyl,
2-chloro-6-cyano-4-nitrophenyl,
2-cyano-4-nitrophenyl,
2-chloro-4-cyanophenyl,
2-chloro-4-ethoxycarbonylphenyl,
2,5-dichloro-4-cyanophenyl and the like. Preferably, the substituted phenyl group D contains not more than three substituents at the para and ortho positions with one of such substituents present at the para and ortho positions with one of such substituents present at the para position.

The groups and residues represented by each of $R^1$ through $R^{10}$ are well known to those skilled in the art and can be derived from readily obtainable materials according to published techniques. The aryl groups which can be present on our novel compounds and the aryl moiety of the o-phenylene groups represented by $R^5$, $R^6$ and $R^7$ preferably are monocyclic, carbocyclic aryl such as phenyl and phenyl substituted with lower alkyl, lower alkoxy or halogen, e.g., chlorine or bromine.

Preferred compounds of our invention are those in which D has the formula

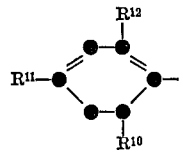

in which $R^{10}$ is hydrogen, nitro or cyano, $R^{11}$ is nitro, cyano or lower alkylsulfonyl and $R^{12}$ is hydrogen, chlorine, bromine, lower alkylsulfonyl, trifluoromethyl, lower alkanoyl, or lower alkoxycarbonyl, and in which $R^2$ is hydrogen or, when $R^3$ is hydrogen, $R^2$ is methyl.

A group of our compounds which, because of their cost:performance ratio, are particularly preferred are those having formula (I) wherein:

D is 2-chloro-4-nitrophenyl,
2-bromo-4-nitrophenyl,
4-nitrophenyl,
2-chloro-4-lower alkylsulfonylphenyl,
2-bromo-4-lower alkylsulfonylphenyl,
2,4-di(lower alkylsulfonyl)phenyl,
2-lower alkylsulfonyl-4-nitrophenyl,
2-lower alkylsulfonyl-4-thiocyanatophenyl,
2-cyano-4,6-dinitrophenyl,
2-chloro-6-cyano-4-nitrophenyl,
2-bromo-6-cyano-4-nitrophenyl,
2,6-dicyano-4-nitrophenyl,
2-bromo-4-cyanophenyl,
2-chloro-4-cyanophenyl, or
2,4-dicyanophenyl;

Y is alkylene of one to six carbon atoms;
$R^2$ is hydrogen;
$R^3$ is lower alkyl or benzyl;
$R^4$ is lower alkyl, benzyl or cyclohexyl;
$R^5$ and $R^7$ each is ethylene, trimethylene or o-phenylene;
$R^6$ is o-phenylene;
$R^8$ is lower alkyl; and
$R^9$ is phenyl or tolyl.

Especially valuable dyes for polyester fibers are the blue dyes of formula (I) wherein D is 2-cyano-4,6-dinitrophenyl, 2,6-dicyano-4-nitrophenyl, 2-bromo-6-cyano-4-nitrophenyl or 2-chloro-6-cyano-4-nitrophenyl; Y is alkylene containing one to six carbon atoms; R is succinimido, phthalimido or 1,2-benzisothiazolino-3-one-1,1-dioxide; $R^2$ is hydrogen; and $R^3$ and $R^4$ each is lower alkyl.

Our novel compounds are synthesized by diazotizing a substituted aniline compound and coupling the resulting diazonium salt with a coupler having the formula

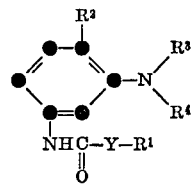

(II)

The couplers can be prepared by a number of known methods such as those diagrammed below:

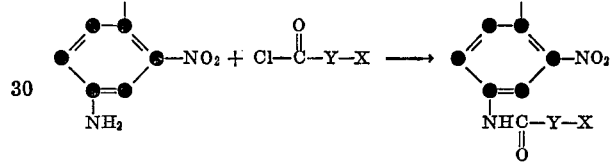

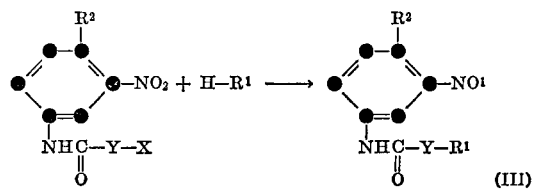

(III)

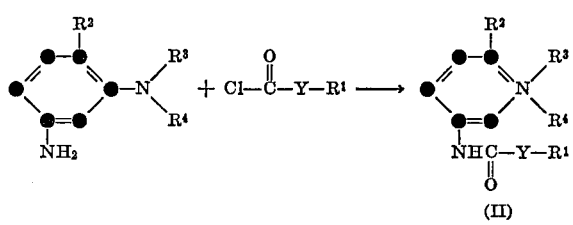

(II)

wherein X is halogen. The nitro compounds (III) can be hydrogenated to yield the corresponding amines which then can be treated further, e.g., alkylated, to obtain couplers of formula (II).

Our novel azo compounds and the synthesis thereof are further illustrated by the following examples.

EXAMPLE 1

A mixture of m-nitroaniline (27.6 g.), chloroacetic anhydride (68.4 g.), toluene (350 ml.), and five drops of sulfuric acid are heated at 60–65° C. for 4 hours. The reaction mixture is allowed to evaporate until a volume of approximately 200 ml. is obtained. The product, 2-chloro-3'-nitroacetanilide, is collected by filtration and dried in air. It melts at 112–114° C.

EXAMPLE 2

A portion (10.7 g.) of the intermediate from Example 1, succinimide (5.5 g.), potassium carbonate (7.6 g.), and N,N-dimethyl formamide (20 ml.) are mixed and heated at 95–100° C. with stirring for 0.5 hour. The reaction mixture is then drowned into water. The product is collected by filtration, washed with water and air dried. The product, 3'-nitro-2-succinimido-acetanilide, melts at 223–225° C.

Analysis.—Calcd. for $C_{12}H_{11}N_3O_5$: C, 52.0; H, 4.0; N, 15.2. Found: C, 52.0; H, 4.1; N, 15.1.

EXAMPLE 3

2-Chloro-3'-nitroacetanilide (10.7 g.) is reacted in DMF (25 ml.) with 1,2-benzisothiazoline-3-one-1,1-dioxide sodium salt (11.3 g.) as described in Example 2 to yield 16.6 g. of product having the structure

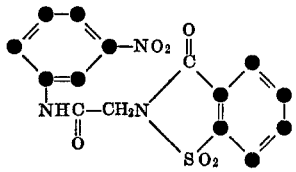

and melting at 213–215° C.

EXAMPLE 4

2-Chloro-3'-nitroacetanilide (10.7 g.), potassium phthalimide (9.3 g.), triethyl phosphate (25 ml.) are heated at 60–80° C. for 0.75 hour. The reaction mixture is drowned into water. The product is collected by filtration and washed with water and then ethanol. The 3'-nitro-2-phthalimidoacetanilide thus formed melts at 235–238° C.

EXAMPLE 5

2-Chloro-3'-nitroacetanilide (10.8 g.), 5,5-dimethylhydantoin (6.4 g.), potassium carbonate (6.9 g.), and DMF (25 ml.) are mixed and heated at 95–100° C. for 1.5 hours. The reaction mixture is drowned into water and the product collected by filtration, washed with water, and dried in air. The product melts at 247–252° C. and has the structure

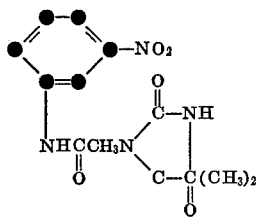

EXAMPLE 6

3'-Nitro-2-succinimidoacetanilide (5.5 g.) is hydrogenated in 150 ml. of ethanol in the presence of 2 g. of Raney nickel catalyst at 75° C. and 1500 p.s.i. $H_2$ pressure until uptake ceases. The Raney nickel is filtered from the hot solution and the filtrate is concentrated to yield the product, 3'-amino-2-succinimidoacetanilide, which melts at 193–195° C.

EXAMPLE 7

A mixture of 3'-amino-2-succinimidoacetanilide (2.5 g.), triethyl phosphate (10 ml.), and bromoethane (3.3 g.) is refluxed gently for 2.5 hours and then drowned into water. The mixture is then basified with conc. $NH_4OH$. The white solid product, 3'-(N,N-diethylamino)-2-succinimidoacetanilide, is collected by filtration and dried. It melts at 96–98° C.

Analysis.—Calcd. for $C_{16}H_{21}N_3O_3$: C, 63.3; H, 7.0; N, 13.9. Found: C, 62.9; H, 7.1; N, 13.5.

EXAMPLE 8 m-Nitroaniline (13.8 g.), pyridine (50 ml.), and 3-succinimidopropionyl chloride (19.0 g.) are mixed and heated at 95° C. for 4.0 hours. The reaction mixture is then drowned into water. The oily product, 3'-nitro-3-succinimidopropionanilide, crystallizes gradually and is collected by filtration.

EXAMPLE 9

The 3' - nitro - 3 - succinimidopropionanilide derivative from Example 8 is hydrogenated as in Example 6 to yield the amine. This amine is diethylated as in Example 7 to yield 3'-(N,N-diethylamino)3-succinimidopropionanilide, which melts at 119–122° C.

EXAMPLE 10

To 5 ml. of conc. $H_2SO_4$ is added 0.72 g. $NaNO_2$ portionwise with stirring. The solution is cooled and 10 ml. of 1:5 acid (1 part propionic/5 parts acetic acid—v./v.) is added below 25° C. The mixture is cooled and .01 mole of 2-bromo-4,6-dinitroaniline, followed by 10 ml. 1:5 acid, is added below 5° C. The diazotization is stirred at 0–5° C. for 2 hours and is then added gradually to a chilled solution of 3'-(N,N-diethylamino-2-succinimidoacetanilide) (3.03 g.) dissolved in 40 ml. of 1:5 acid. The coupling is buffered by adding ammonium acetate and allowed to stand for 0.5 hour. The azo product is precipitated by drowning into water and is collected by filtration, washed with water, and dried in air. The product produces deep violet dyeings on polyester fibers and has good resistance to sublimation.

EXAMPLE 11

A portion of the dye from Example 10 (1.0 g.) is treated with 0.16 g. of CuCN in pyridine for 15 minutes. The replacement of the bromine atom with the cyano group is complete as evidenced by thin-layer chromatography. The reaction mixture is drowned into water and the dye is collected by filtration, washed in water, and air dried. It is slurried in hot methanol (35 ml.) and then this mixture is cooled. The dye is filtered off and dried in air. It produces bright blue shades on polyester fibers, exhibits excellent fastness to light, resistance to sublimation, and dyeability.

The azo compounds set forth in the examples of the following Table conform to formula (I) and are prepared by the procedures described hereinabove. The color given for each azo compound refers to the shade it produces on polyester fibers. Examples 10 and 11 of the Table designate the structures of the azo compounds prepared as described hereinabove.

TABLE

| Example No. | D | Y | R¹ | R² | R³ | R⁴ | Color |
|---|---|---|---|---|---|---|---|
| 10 | 2-Br-4,6-di-NO₂-phenyl | —CH₂— | —NCOCH₂CH₂CO | H | —C₂H₅ | —C₂H₅ | Violet. |
| 11 | 2-CN-4,6-di-NO₂-phenyl | —CH₂— | —NCOCH₂CH₂CO | H | —C₂H₅ | —C₂H₅ | Blue. |
| 12 | 2-Cl-4-NO₂-phenyl | —CH₂CH₂— | —NCOCH₂CH₂CO | H | —C₂H₅ | —C₂H₅ | Rubine. |
| 13 | 2-Br-6-CN-4-NO₂-phenyl | —CH₂— | —NCOCH₂CH₂CO | H | —C₂H₅ | —C₂H₅ | Blue. |
| 14 | 2,6-di-CN-4-NO₂-phenyl | —CH₂— | —NCOCH₂CH₂CO | H | —C₂H₅ | —C₂H₅ | Do. |
| 15 | 2-CN-4,6-di-NO₂-phenyl | —CH₂CH₂— | —NCOCH₂CH₂CO | H | —C₂H₅ | —C₂H₅ | Do. |
| 16 | 2-CN-4,6-di-NO₂-phenyl | —CH₂CH₂— | —NCOCH₂CH₂CO | H | —C₂H₅ | —C₂H₅ | Do. |
| 17 | 2-CN-4,6-di-NO₂-phenyl | —CH₂CH₂— | —NCO—o—C₆H₄CO— | H | —C₂H₅ | —C₂H₅ | Do. |
| 18 | 2-CN-4,6-di-NO₂-phenyl | —CH₂CH₂— | —NCO—C₆H₁₀CO | H | —C₂H₅ | —C₂H₅ | Do. |
| 19 | 2-CN-4,6-di-NO₂-phenyl | —CH₂CH₂— | —NCO—o—C₆H₄SO₂— | H | —C₂H₅ | C₆H₁₁ | Do. |
| 20 | 2-CN-4,6-di-NO₂-phenyl | —CH₂CH₂— | —NCOCH₂OCH₂CO— | —CH₃ | H | —C₂H₅ | Do. |
| 21 | 2-CN-4,6-di-NO₂-phenyl | —CH₂CH₂— | —NCOCH₂CH₂CO— | H | —C₂H₅ | —C₂H₅ | Do. |
| 22 | 2-CN-4,6-di-NO₂-phenyl | —(CH₂)₃— | —NCO(CH₂)₃CO— | H | —C₂H₅ | —C₂H₅ | Do. |
| 23 | 2-CN-4,6-di-NO₂-phenyl | —(CH₂)₃— | —NCO(CH₂)₃CO— | H | —C₂H₅ | —C₂H₅ | Do. |
| 24 | 2-CN-4,6-di-NO₂-phenyl | —CH(C₂H₅)— | —NCOCH₂CH₂CO— | H | —C₂H₅ | —C₂H₅ | Do. |
| 25 | 2-CN-4,6-di-NO₂-phenyl | —CH—(CH₂CH₂CH₃)— | —NCOCH₂CH₂CO— | H | —C₂H₅ | —C₂H₅ | Do. |
| 26 | 2-CN-4,6-di-NO₂-phenyl | —CH₂— | —NCOCH₂CH₂CH₂— | H | —C₂H₅ | —C₂H₅ | Do. |
| 27 | 2-CN-4,5-di-NOphenyl | —CH₂— | —NCO—o—C₆H₄CH₂— | H | —C₂H₅ | —CH₂C₆H₅ | Do. |
| 28 | 2-CN-4,6-di-NO₂-phenyl | —CH₂— | —N(CH₃)SO₂C₆H₅ | H | —C₂H₅ | —CH₂C₆H₁₁ | Do. |
| 29 | 2-CN-4,6-di-NO₂-phenyl | —CH₂— | —N(CH₃)SO₂C₆H₅ | H | —C₂H₅ | —CH(CH₃)C₂H₅ | Do. |
| 30 | 2-CN-4,6-di-NO₂-phenyl | —CH₂— | —N(C₂H₅)SO₂C₆H₄-p-CH₃ | H | —C₂H₅ | —CH₂CH(CH₃)₂ | Do. |
| 31 | 2-Br-6-CN-4-NO₂-phenyl | —CH₂CH₂— | —NCOCH₂CH₂CO | H | —C₂H₅ | —C₂H₅ | Do. |
| 32 | 2-CN-4,6-di-NO₂-phenyl | —CH₂CH₂— | —NCONHCH₂CO | H | —C₂H₅ | —C₂H₅ | Do. |
| 33 | 2-Br-6-CN-4-NO₂-phenyl | —CH₂CH₂— | —NCOSCH₂CO | H | —C₂H₅ | —C₂H₅ | Do. |

| No. | | | | | | | |
|---|---|---|---|---|---|---|---|
| 34 | 2-Br-6-CN-4-NO₂-phenyl | —CH₂CH₂— | —NCONHCH₂CH₂CO | H | —C₂H₅ | —C₂H₅ | Blue. |
| 35 | 2-Br-6-CN-4-NO₂-phenyl | —CH₂CH₂— | —NCONHC(CH₃)₂CO | H | —C₂H₅ | —C₂H₅ | Do. |
| 36 | 2-Br-6-CN-4-NO₂-phenyl | —CH₂CH₂— | —NCOCH₂CH₂CO | H | —C₂H₅ | —C₂H₅ | Do. |
| 37 | 2-Br-6-CN-4-NO₂-phenyl | —CH₂CH₂— | —NCOCH₂CH₂CO | H | —C₂H₅ | —C₂H₅ | Do. |
| 38 | 2,6-di-CN-4-NO₂-phenyl | —CH₂CH₂— | —NCOCH₂CH₂CO | H | —C₂H₅ | —CH₂CH(CH₃)₂ | Do. |
| 39 | 2,6-di-CN-4-NO₂-phenyl | —CH₂CH₂— | —NCOCH₂CH₂CO | H | —CH₂CH₂OH | —C₂H₅ | Do. |
| 40 | 2,6-di-CN-4-NO₂-phenyl | —CH₂CH₂— | —NCOCH₂CH₂CO | H | —CH₂CH(OH)CH₃ | —C₂H₅ | Do. |
| 41 | 2,6-di-CN-4-NO₂-phenyl | —CH₂CH₂— | —NCOCH₂CH₂CO | H | —CH₂CH(OH)CH₂OH | —C₂H₅ | Do. |
| 42 | 2,6-di-CN-4-NO₂-phenyl | —CH₂CH₂— | —NCOCH₂CH₂CO | H | —CH₂CH₂OH | —CH₂CH₂OH | Do. |
| 43 | 2-CN-4-NO₂-6-SO₂C₂H₅-phenyl | —CH₂CH₂— | —NCOCH₂CH₂CO | H | —C₂H₅ | —C₂H₅ | Do. |
| 44 | 2-CN-4-NO₂-6-SO₂CH₃-phenyl | —CH₂CH₂— | —NCOCH₂CH₂CO | H | —C₂H₅ | —C₂H₅ | Do. |
| 45 | 2-CN-4-NO₂-6-SO₂N(C₂H₅)2-phenyl | —CH₂CH₂— | —NCOCH₂CH₂CO | H | —C₂H₅ | —C₂H₅ | Do. |
| 46 | 2-CN-4-NO₂-6-SC₂H₅-phenyl | —CH₂CH₂— | —N(C₂H₅)SO₂C₆H₅ | H | —C₂H₅ | —C₂H₅ | Do. |
| 47 | 2—CN—4—NO₂—6—S—C=N—NH—CH=N—phenyl | —CH₂CH₂— | —NCOCH₂CH₂CO | H | —C₂H₅ | —C₂H₅ | Do. |
| 48 | 2—CN—4—NO₂—6—S—C=N—o—C₆H₄—S—phenyl | —CH₂CH₂— | —NCOCH₂CH₂CO | H | —C₂H₅ | —C₂H₅ | Violet. |
| 49 | 2,6-di-CN-4-N=N—C₂H₅-phenyl | —CH₂CH₂— | —NCOCH₂CH₂CO | H | —C₂H₅ | —C₂H₅ | Do. |
| 50 | 2,6-di-CN-4-SO₂CH₃-phenyl | —CH₂CH₂— | —NCOCH₂CH₂CO | —CH₃ | H | —C₂H₅ | Do. |
| 51 | 2,6-di-CN-4-COCH₃-phenyl | —CH₂CH₂— | —NCOCH₂CH₂CO | H | —C₂H₅ | —C₂H₅ | Do. |
| 52 | 2,6-di-CN-4-COC₆H₅-phenyl | —CH₂CH₂— | —NCOCH₂CH₂CO | H | —C₂H₅ | —C₂H₅ | Do. |
| 53 | 2,6-di-CN-4-SO₂C₆H₅-phenyl | —CH₂CH₂— | —NCOCH₂CH₂CO | H | —C₂H₅ | —C₂H₅ | Do. |
| 54 | 2-CN-4-NO₂-phenyl | —CH₂CH₂— | —NCOCH₂CH₂CO | H | —C₂H₅ | —C₂H₅ | Do. |
| 55 | 2,6-di-CN-4-SO₂CH₃-phenyl | —CH₂CH₂— | —NCOOCH₂CH₂CO | H | —C₂H₅ | —C₂H₅ | Red. |
| 56 | 2-Cl-4-NO₂-phenyl | —CH₂— | —NCOCH₂CH₂CO | H | —C₂H₅ | —C₂H₅ | Red. |
| 57 | 2-Cl-4-NO₂-phenyl | —CH₂— | —NCO—o—C₆H₄SO₂ | H | —C₂H₅ | —C₂H₅ | Red. |
| 58 | 2-Cl-4-SO₂CH₃-phenyl | —CH₂— | —NCO—o—C₆H₄SO₂ | H | —C₂H₅ | —C₂H₅ | Orange. |

TABLE—Continued

| Example No. | D | Y | R¹ | R² | R³ | R⁴ | Color |
|---|---|---|---|---|---|---|---|
| 59 | 2-Cl-4-SO₂CH₃-phenyl | —CH₂— | —NHCO—o—C₆H₄CO | H | —C₂H₅ | —C₂H₅ | Orange. |
| 60 | 2-Cl-4-SO₂CH₃-phenyl | —CH₂— | —NHCOC₆H₄NHCO | H | —C₂H₅ | —C₂H₅ | Do. |
| 61 | 2,4-di-SO₂CH₃-phenyl | —CH₂— | —NHCO—o—C₆H₄SO₂ | H | —C₂H₅ | —C₂H₅ | Red. |
| 62 | 2-Cl-4-NO₂-phenyl | —CH₂— | —NHCOCH₂CH₂CH₃ | H | —CH₂(C₂H₅)(CH₂)₃CH₃ | —C₂H₅ | Red. |
| 63 | 2-Cl-4-NO₂-phenyl | —CH₂— | —NHCO(CH₂)₂CH₃ | H | —CH₂CH(CH₃)₂ | —C₂H₅ | Red. |
| 64 | 2-Cl-4-NO₂-phenyl | —CH₂— | —NHCOCH₂OH₂CH₃ | H | —CH₂CH₁₁ | —C₂H₅ | Red. |
| 65 | 2-Cl-4-NO₂-phenyl | —CH₂— | —NHCOCH₂CH₂CH₃ | —CH₃ | H | —C₆H₁₁ | Red. |
| 66 | 2-Cl-4-NO₂-phenyl | —CH₂— | —NHCO—o—C₆H₄CH₃ | —CH₃ | H | —CH₂C₆H₅ | Red. |
| 67 | 2-Cl-4-CN-phenyl | —CH₂— | —NHCOCH₂CH₂CO | H | —CH₂C₆H₅ | —CH₂C₆H₅ | Red. |
| 68 | 4-NO₂-phenyl | —CH₂— | —NHCOCH₂CH₂CO | H | —CH₂C₆H₁₁ | —C₂H₅ | Red. |
| 69 | 4-SO₂CH₃-phenyl | —CH₂CH₂— | —NHCOCH₂CH₂CO | H | —C₂H₅ | —C₂H₅ | Orange. |
| 70 | 2-Br-8-SO₂CH₃-phenyl | —CH₂CH₂— | —NHCOCH₂CH₂CO | H | —C₂H₅ | —C₂H₅ | Do. |
| 71 | 2-Br-6-Cl-4-SO₂CH₃-phenyl | —CH₂CH₂— | —NHCOCH₂CH₂CO | H | —C₂H₅ | —C₂H₅ | Yellow. |
| 72 | 2-SO₂CH₃-4-NO₂-phenyl | —CH₂CH₂— | —NHCOCH₂CH₂CO | H | —C₂H₅ | —C₂H₅ | Red. |
| 73 | 2,4-di-NO₂-6-SO₂CH₃ | —CH₂CH₂— | —NHCOCH₂CH₂CO | H | —C₂H₅ | —C₂H₅ | Blue. |

The invention is described herein in detail with particular reference to preferred embodiments thereof, but it will be understood that variations and modifications can be effected within the spirit and scope of the invention.

The compounds of the invention can be applied to polyester by known disperse dyeing techniques employing carriers, surfactants, dispersing agents, etc. Dyeing can be conducted at atmospheric or super-atmospheric pressures. The following example illustrates a carrier dyeing procedure for applying the azo compounds of the invention to dye polyester textile materials.

EXAMPLE 74

An amount of 0.1 g. of the azo compound of Example 1 is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an o-phenylphenol emulsion (Carolid) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 75

A mixture of: 500 mg. of the compound of Example 3, 150 mg. of a sodium lignosulfonate dispersing agent (Maraspere N), 150 mg. of a partially desulfonated sodium lignosulfonate (Maraspere CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant (compound 8–S), 3 ml. of a 3% solution of a sodium N-methyl-N-oleoyl-taurate (Igepon T–S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

Ten g. of a fabric of poly(ethylene terephhtalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics. The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyl-taurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymer linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the novel compounds of the invention are particularly useful as dyes for polyester textile materials, the novel compounds also can be used to dye other hydrophobic textile materials such as cellulose acetate, polyamide and modacrylic fibers.

The invention has been described in considerable detail with particular reference to certain preferred embodiments thereof, but it will be understood that variations and modifications can be effected within the spirit and scope of the invention.

We claim:
1. A compound having the formula

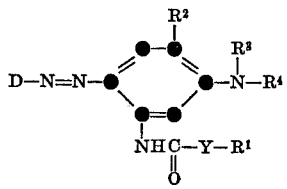

wherein

D is a group having the formula

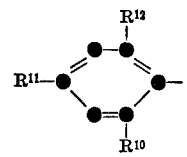

wherein $R^{10}$ is hydrogen, nitro or cyano, $R^{11}$ is nitro, cyano or lower alkylsulfonyl and $R^{12}$ is hydrogen, chlorine, bromine, lower alkylsulfonyl, trifluoromethyl, lower alkanoyl or lower alkoxycarbonyl, and $R^2$ is hydrogen or when $R^3$ is hydrogen, $R^2$ is methyl;

Y is alkylene of one to six carbon atoms;

$R^1$ is a group having the formula

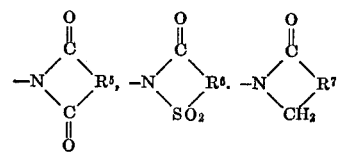

wherein $R^5$ is alkylene of two or three carbon atoms, alkylene of two or three carbon atoms substituted with lower alkanoyloxy, orthocyclohexylene, ortho-phenylene, methylene, oxymethylene, —N($R^{10}$)—(CH$_2$)$_n$— in which $R^{10}$ is hydrogen and $n$ is one or two, or —SCH$_2$—;

$R^6$ is ortho-phenylene;

$R^7$ is alkylene of two or three carbon atoms or ortho-phenylene;

$R^2$ is hydrogen, lower alkyl or lower alkoxy;

$R^3$ is hydrogen, alkyl having one to eight carbon atoms, cyclohexylmethyl or benzyl; and $R^4$ is lower alkyl, cyclohexylmethyl, benzyl or cyclohexyl.

2. A compound according to claim 1 wherein
D is
2-chloro-4-nitrophenyl,
2-bromo-4-nitrophenyl,
4-nitrophenyl,
2-chloro-4-lower alkylsulfonylphenyl,
2-bromo-4-lower alkylsulfonylphenyl,
2-4-di(lower alkylsulfonyl)phenyl,
2-lower alkylsulfonyl-4-nitrophenyl,
2-lower alkylsulfonyl-4-thiocyanatophenyl,
2-cyano-4,6-dinitrophenyl,
2-chloro-6-cyano-4-nitrophenyl,
2-bromo-6-cyano-4-nitrophenyl,
2,6-dicyano-4-nitrophenyl,
2-bromo-4-cyanophenyl,
2-chloro-4-cyanophenol, or
2,4-dicyanophenyl;

Y is alkylene of one to six carbon atoms;

$R^2$ is hydrogen;

$R^3$ is lower alkyl or benzyl;

$R^4$ is lower alkyl, benzyl or cyclohexyl;

$R^5$ and $R^7$ each is ethylene, trimethylene or ortho-phenylene; and $R^6$ is ortho-phenylene.

3. A compound according to Claim 1 having the formula

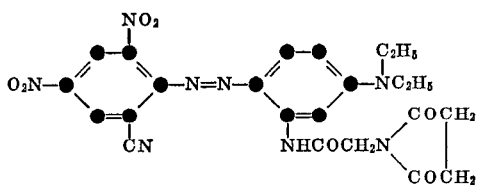

4. A compound according to Claim 1 having the formula

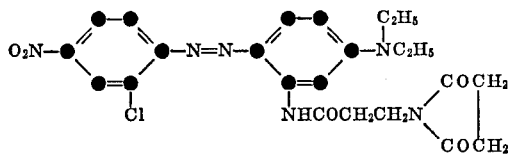

5. A compound according to Claim 1 having the formula

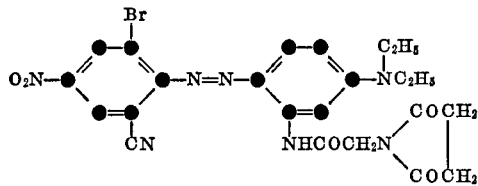

6. A compound according to Claim 1 having the formula

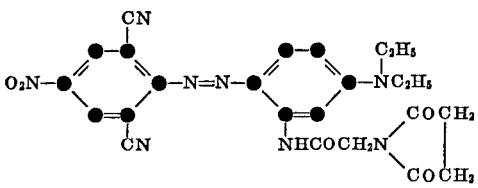

7. A compound according to Claim 1 having the formula

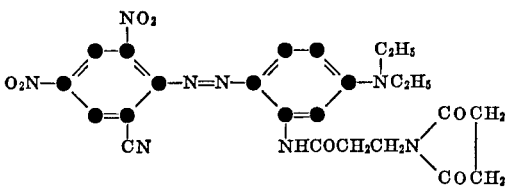

References Cited
UNITED STATES PATENTS

| | | | |
|---|---|---|---|
| 3,148,181 | 9/1964 | Wallace et al. | 260—156 X |
| 3,619,108 | 11/1971 | Peter et al. | 260—158 X |
| 3,632,565 | 1/1972 | Angliker et al. | 260—158 X |

LORRAINE WEINBERGER, Primary Examiner

C. F. WARREN, Assistant Examiner

U.S. Cl. X.R.

8—41 C; 260—154, 156, 157, 158, 207, 207.1, 239 A, 256.4 C, 293.77, 302, 307 A 309.7, 326.3